United States Patent [19]
Koser

[11] 4,285,206
[45] Aug. 25, 1981

[54] AUTOMATIC REFRIGERANT RECOVERY, PURIFICATION AND RECHARGE APPARATUS

[75] Inventor: Richard Koser, Croton Falls, N.Y.
[73] Assignee: Draf Tool Co., Inc., Bedford Hills, N.Y.
[21] Appl. No.: 9,555
[22] Filed: Feb. 5, 1979
[51] Int. Cl.³ .......................................... F25B 45/00
[52] U.S. Cl. ...................................... 62/126; 62/149; 62/292
[58] Field of Search .................... 62/149, 85, 292, 474, 62/126

[56] References Cited
U.S. PATENT DOCUMENTS

| | | |
|---|---|---|
| 3,232,070 | 2/1966 | Sparano ................................ 62/149 |
| 4,030,315 | 6/1977 | Harnish ............................ 62/513 X |
| 4,106,306 | 8/1978 | Saunders ............................... 62/149 |
| 4,175,398 | 11/1979 | Edwards et al. ....................... 62/149 |

*Primary Examiner*—William E. Wayner
*Attorney, Agent, or Firm*—Blum, Kaplan, Friedman, Silberman & Beran

[57] ABSTRACT

Automatic recovery and purification of refrigerant from air-conditioners about to be discarded or repaired is provided for. In addition, the reclaimed refrigerant with or without fresh refrigerant can be recharged to air-conditioning systems. The apparatus is particularly useful in connection with automatic reclaim and recharge of vehicular air-conditioners where the operation is to carried out at a service station at low cost by semi-skilled operators.

45 Claims, 3 Drawing Figures

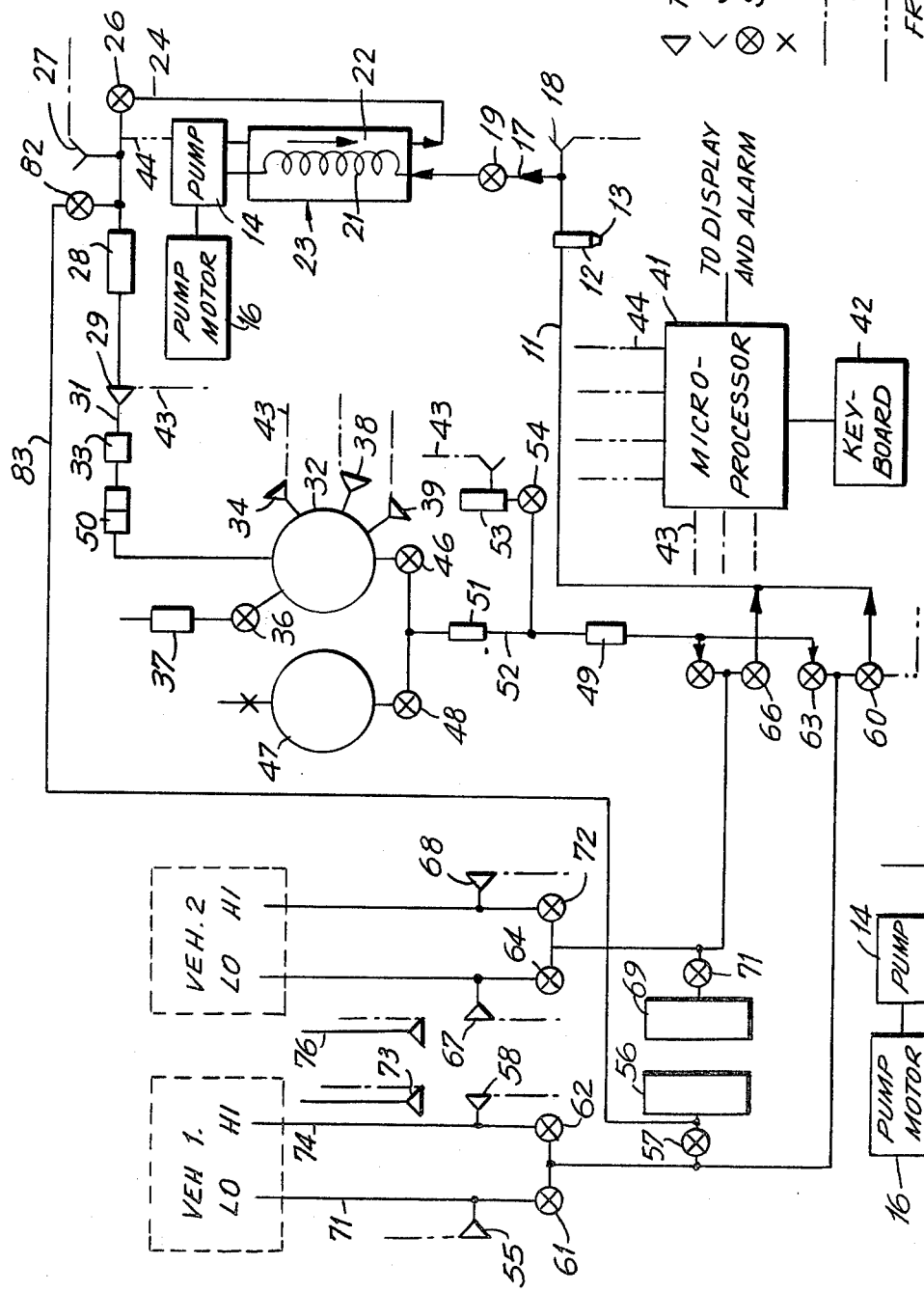

AUTOMATIC REFRIGERANT RECOVERY, PURIFICATION AND RECHARGE APPARATUS

BACKGROUND OF THE INVENTION

In the junking of air conditioners such as are used in vehicles, it has been standard practice to allow the refrigerant to escape. Also, in preparation for carrying out repairs on an air conditioner it has frequently been the practice to vent the refrigerant therefrom. Such a practice is uneconomical. Moreover, it is now recognized that the introduction of refrigerant into the atmosphere can have serious consequences with respect to destruction of ozone in the atmosphere, ozone providing a shield against penetration of the atmosphere by ultraviolet rays which are known to be carcinogenic.

As aforenoted, refrigerant may be vented in preparation for discard or repair of air conditioners. When the air conditioner of a vehicle is to be repaired, the repair is carried out by an operator who is, at best, only semi-skilled in the processing of gases. Accordingly, if such an individual is to cope with a procedure for recovering the refrigerant from a vehicle, apparatus must be provided which requires only minimal supervision by an operator. The same consideration applies to recovery of refrigerant from other types of air conditioners whether about to be repaired or discarded. A further operation which such apparatus should carry out is the recharging of a repaired air conditioner, whether the air conditioner is or is not part of a vehicle such as an automobile or a truck. Accordingly, there is considerable need for such equipment.

SUMMARY OF THE INVENTION

Automatic apparatus for recovery and purification of refrigerant in accordance with the present invention includes a motor pump for drawing refrigerant from an air conditioner and transferring the refrigerant to a tank. The refrigerant is drawn through a filter which removes particulate matter down to sub-micron size and coalesces oil droplets. These oil droplets contain any acid present. The coalesced oil can be removed periodically by removal of the filter bowl or through a clean-out plug. The motor pump draws the refrigerant through an evaporator coil so that the refrigerant is in the vapor state as it reaches the compressor portion of the motor pump. The compressed refrigerant is introduced into a condenser after which it traverses a filter which dries the refrigerant down to a content of about 10 ppm. Any residual acid, oil or particulate matter is also removed by this filter. A moisture detector determines the water content of the effluent from this filter. A check-valve is preferably disposed in the line to insure that refrigerant cannot return from the storage tank toward the pump.

A solenoid valve is disposed between the first filter and the evaporator and between the condenser and the second filter. A pressure switch measures the pressure on the entrance side of the evaporator and when this pressure drops to a value such as to correspond with substantially complete removal of refrigerant from the air conditioner, the pressure switch closes the aforementioned solenoid valves between the first filter and the evaporator and between the condenser and the second filter.

A second pressure switch measures the pressure on the outlet side of the condenser. Should this pressure rise to a value such as to indicate that there is non-condensible gas present or a blockage in the line, the aforementioned solenoid valves between the condenser and the second filter and between the first filter and the evaporator are automatically shut by the second pressure switch. Preferably, the first pressure switch is set to operate when the pressure on the inlet side of the condenser drops to about 20 inches of mercury below atmospheric. Also, it is preferred that the second pressure switch close its corresponding solenoid valve when the pressure at said second pressure switch reaches about 200 psig. The motor pump operates continuously when power is applied to the apparatus. Closing the solenoid valves effectively stops the transfer process. The motor load would be excessive for the switches if run intermittently. Complications from the presence of oil in the motor sump are minimized when the motor is kept warm through continuous operation.

In a preferred construction, a microprocessor is provided which is programmable for initiation of a refrigerant-recovery operation on command and for shut-down of said apparatus and producing an alarm signal when the time for the pressure on the inlet side of the evaporator coil to drop to a preselected value exceeds a preselected period of time, when either of said pressure switches is closed, when the moisture detector indicates the presence of excess moisture in the refrigerant, when the quantity of refrigerant in the storage tank reaches a preselected value or when the pressure in the refrigerant tank reaches a preselected value.

The apparatus can also be constructed for recharging one or more air conditioners using reclaimed refrigerant and/or fresh refrigerant. The apparatus then includes one or more vacuum pumps for pumping down the air conditioner to be recharged, the corresponding pressure sensors to determine when the pressure in the air conditioner is low enough for the start of recharge with fresh refrigerant, a metering pump for transfer of refrigerant from the storage tank or tanks to the selected vehicle and, preferably, an additional metering pump for adding lubricating oil to the recharge refrigerant at a controlled ratio.

The microprocessor is preferably programmable to take care of the additional functions of initiating operation of the vacuum pump for evacuating the air conditioner, isolating the vacuum pump from the air conditioner when the pressure has dropped to a preselected value, initiating flow of refrigerant at a selected rate to the air conditioner, regulation of addition of lubricating oil to the refrigerant at a preselected ratio, and stopping flow of refrigerant and oil to the air conditioner when the quantity transferred reaches a preselected value. The apparatus has a manifold and sufficient branched lines and solenoid valves controllable by the microprocessor so that the operation of recovery of refrigerant from one air conditioner and the operation of recharging a second air conditioner may be carried out simultaneously and automatically under the control of microprocessor.

Preferably, one or more of the vent lines from the storage tanks and the vacuum pumps may be chilled to recover refrigerant in the air flowing out therefrom.

Accordingly, an object of the present invention is an automatic apparatus for recovery and purification of refrigerant.

Another object of the present invention is an automatic apparatus including a microprocessor for recovery and purification of refrigerant.

A further object of the present invention is an automatic apparatus for recovery and purification of refrigerant from air conditioners and for charging air conditioners with refrigerant with minimal loss of refrigerant to the atmosphere.

An important object of the present invention is an automatic apparatus for recovery and purification of refrigerant and recharging of air conditioners with refrigerant under the control of a microprocessor.

A significant object of the present invention is an automatic apparatus for the recovery and purification of refrigerant and for recharge of air conditioners with refrigerant where the recovery and purification of refrigerant from one air conditioner may be carried out simultaneously with recharge of another air conditioner with refrigerant.

Yet another important object of the present invention is an automatic apparatus for recovery and purification of refrigerant and for recharge of an air conditioner with refrigerant in which a microprocessor is programable to initiate operation on command and for carrying out all the essential steps including shut-down at the conclusion of operation without intervention by an operator.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a schematic view of apparatus in accordance with the present invention;

FIG. 2 shows schematically the relative positions of an evaporator coil, a condenser coil, the motor of a motor pump and a fan.

DESCRIPTION OF THE PREFERRED EMBODIMENTS

Figure 3:
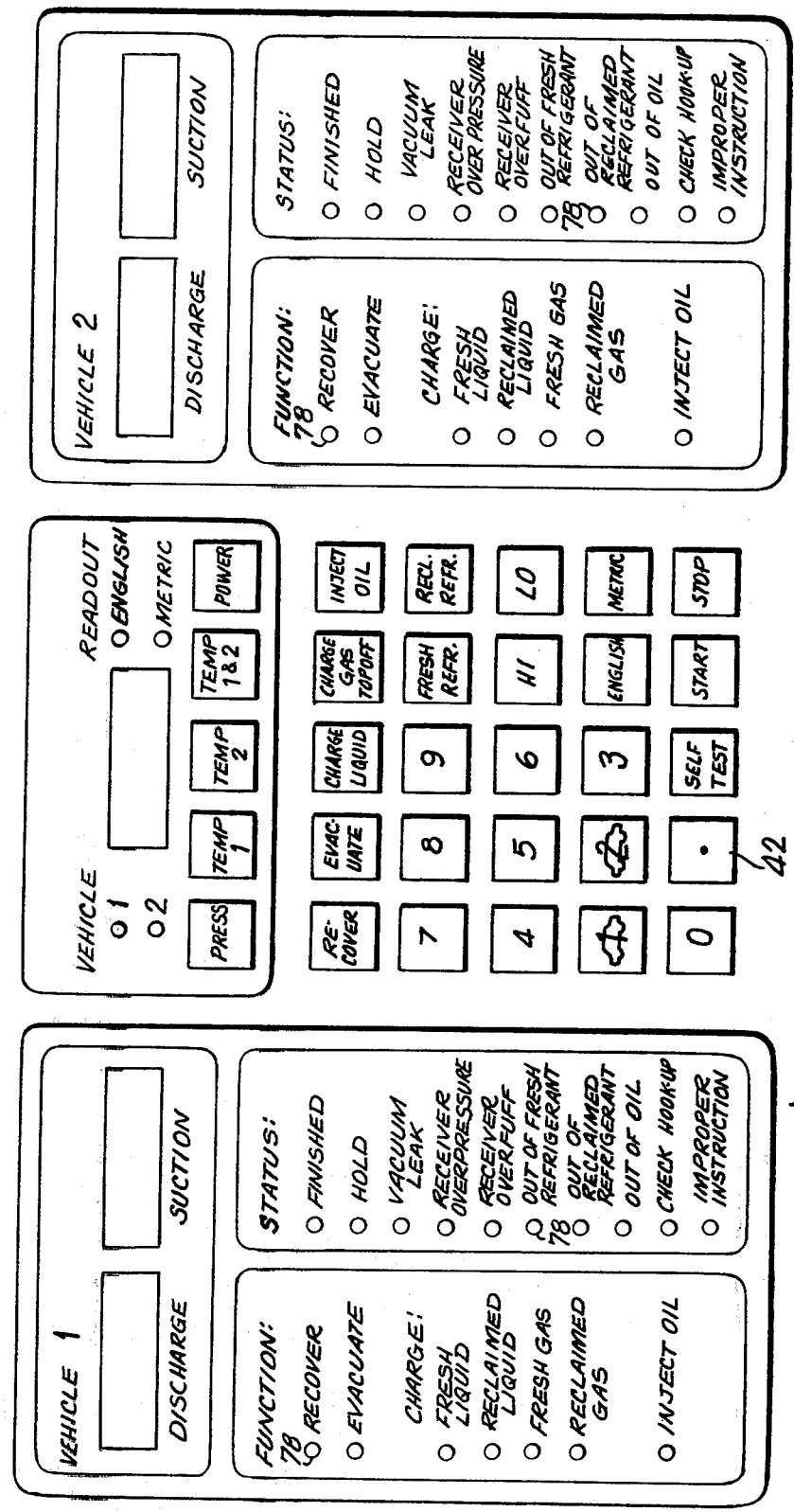
FIG. 3 is a representation of a keyboard and display of the automatic apparatus of the present invention.

The present invention will be discussed in terms of vehicular air conditioners since it is envisioned that the principal use for the apparatus will be in connection with such air-conditioner systems and that the apparatus will be operated by the personnel of automobile service stations. However, the apparatus of the present invention can be adapted to service refrigeration systems of any size such as those used in railroad passenger cars, railroad box cars, warehouses and ships, the apparatus being compact enough so that it is mobile.

Turning now to FIG. 1, a conduit 11 has a flexible end 71 which can be connected with an air conditioner for exhausting the refrigerant therefrom. As the pressure is dropped in conduit 11, refrigerant is drawn through solenoid valve 60 and said conduit to reach filter 12 which has a packing therein fine enough to remove particulate matter down to sub-micron size. In addition, filter 12 serves to coalesce oil droplets in the refrigerant; the oil droplets form a pool of oil at the bottom of said filter from which the oil can be withdrawn periodically through clean-out plug 13 or by removing the bowl. Any acid in the refrigerant tends to migrate into the oil so that removal of the oil droplets also results in removal of the acid from the refrigerant.

Pump 14 driven by pump motor 16 drops the pressure in conduit 11, filter 12 and conduit 17 progressively until substantially complete removal of refrigerant from the air conditioner in vehicle 1 has been effected. The pressure in conduit 17 is measured by pressure switch 18 and when the pressure therein has dropped to the aforenoted level, solenoid value 19 is shut as is solenoid valve 26 on the outlet side of pump 14.

Refrigerant is drawn through the evaporator 21 so that it is in the vapor state when it reaches pump 14. The refrigerant is then compressed by pump 14 to traverse condenser 22 in which the refrigerant, returns to the liquid phase under the combined influence of heat transfer to evaporator coil 21 and the compressor stage (not shown) of pump 14. Evaporator 21 and condenser 22 comprise a heat exchanger given the reference numeral 23.

Refrigerant leaving condenser 22 flows through conduit 24 in which is located solenoid valve 26 and pressure switch 27. Should the pressure in conduit 24 rise above a preselected value, preferably about 200 psig, said pressure switch is connected with solenoid valves 19 and 26 to shut same.

Refrigerant from conduit 24 flows to second filter 28, the primary function of which is to dry the refrigerant. It also functions to remove any residual oil or acid from the refrigerant. For the drying function said second filter may be charged with one or more suitable desiccants well-known to those skilled in the art. A satisfactory desiccant charge includes a high-capacity desiccant such as silica gel and a high intensity desiccant such as activated aluminum oxide, barium oxide or phosphorous pentoxide. Such a desiccant can remove substantial quantities of moisture from the refrigerant and assure that the moisture content of the refrigerant leaving the filter will be at a satisfactorily low level, a preferred maximum for this level being about 10 ppm. Filter 28 may be refillable or it may be replaceable.

To insure that the refrigerant leaving second filter 28 is indeed as dry as desired, moisture detector 29 is provided in conduit 31 to measure the moisture content of the refrigerant flowing therethrough. A number of sensitive moisture detectors are known to those skilled in the art. Conveniently, the moisture detector should provide an electrical signal, either directly or indirectly, which can be used to generate an alarm signal so that the operator will be aware that second filter 28 is no longer functioning satisfactorily, generally because the desiccant charge has been exhausted and needs replacement. A particularly satisfactory form of moisture detector is one in which a moisture-absorptive material is disposed between two electrodes, the presence of moisture in the refrigerant stream causing a decrease in the electrical resistivity of the assembly which can be detected by a suitable resistance meter. Another satisfactory type of moisture detector is one which relies on a color change which can be detected by a suitable transducer which converts the optical change to an electrical signal which can then be used to generate an alarm signal. The signal from moisture detector 29 can be used to shut down the apparatus as will be described below. Refrigerant leaving the moisture detector 29 traverses conduit 31 to tank 32. In the event of failure of the desiccant in filter 28, some moist refrigerant could enter conduit 31 and thus tank 32 before the apparatus is shut down. To prevent contamination of the contents of tank 32, third filter 33 may be positioned downstream from mositure detector 29 to remove any residual moisture. Third filter 33 should be charged with a high intensity desiccant, a high capacity desiccant not being needed since the moisture detector 29 will shut down the apparatus before any substantial quantity of moisture can penetrate second filter 28. Although second and third filters 28 and 33 and moisture detector 29 are shown as separate elements in the apparatus, they can all be contained in one cartridge where moisture detector 29 is in the form of a probe disposed proximate but not at the downstream end of filter 28 in which case the penetration of moisture up to the position of the probe can be detected, a portion of the high intensity desiccant still remaining in the filter downstream from the position of the probe to prevent pentration of the filter charge by moisture. Check value 50 prevents flow of refrigerant in the reverse direction which might occur, especially during shutdowns.

As tank 32 fills with refrigerant any non-condensible gas, air for example, in the upper portion of the tank is compressed and the pressure in the tank rises. Pressure switch 34 measures the pressure within tank 32 and opens solenoid value 36 at a preselected pressure value. Preferably, a refrigerated condenser 37 is provided for condensing out refrigerant vapor from the vented, non-condensible gas and recovering the condensate. Tank 32 may also be provided with temperature sensor 38 and quantity sensor 39 for determining the quantity of refrigerant in tank 32. Quantity sensor 39 may take the form of a sight glass or a pressure or weight sensor which cooperates with pressure sensor 34 to indicate the quantity of liquid in said tank.

As aforenoted, the essential operations of reclaiming and purifying refrigerant and transferring said refrigerant to storage tank 32 can be carried out automatically by the arrangements already described, such arrangements including closing the solenoid valves when the pressure in conduit 17 drops to a selected value, when the pressure in conduit 24 rises above a selected value and when the moisture level in the refrigerant in conduit 31 rises above a selected value. However, these functions are best carried out by a microprocessor 41 programmable by a keyboard 42. Connections from the various pressure switches, temperature sensors, etc. to the microprocessor are indicated by the dash and single dot lines given the reference numeral 43 in FIG. 1. The various solenoids, and thereby pump 14, are then controlled by microprocessor 41 through control lines shown in FIG. 1 as formed by an alternating dash and a pair of dots and given the reference numeral 44. For convenience, these control lines have been omitted from most of the solenoid valves.

As stated above, the apparatus may also be constructed for charging an air conditioning system with refrigerant. Reclaimed refrigerant is drawn from storage tank 32 through solenoid valve 46 or from supplementary tank 47 of fresh refrigerant through solenoid valve 48 by a second motor pump 49. The rate at which said refrigerant is drawn from the tank depends upon whether the refrigerant is to be fed to the low side or to the high side of the air-conditioner system which is to be charged. From the operator's points of view, high-side versus low-side is primarily a matter of preference or adherence to training and experience. High-side, liquid charging is often used for an empty system because it is fast. Low-side, gas charging is often used to replenish a partially charged system. For charging to the low side the refrigerant is drawn slowly enough so that at least the major part thereof is vaporized and any residual liquid refrigerant is in the form of a spray of droplets fine enough in size so that the compressor in the air-conditioning system being charged will not be injured. Where the air-conditioning system is to be fed on the high side thereof, the rate of flow of refrigerant may be much higher. To insure that the refrigerant is in the proper state, a sight glass 51 is provided in conduit 52 leading from the storage tanks to motor pump 49. As long as there is refrigerant in the supply tank it will be withdrawn in a liquid state. Sight glass 51, a preferred embodiment, will thusly indicate when the supply is empty. An optical detector (not shown) attached thereto could terminate charging should the supply run out or could switch supplies, by means of valves 46 and 48, from reclaimed to fresh refrigerant. In general, it is necessary to supply lubricating oil to the air-conditioning system and this is fed by metering pump and tank 53 through solenoid valve 54 at a selected rate consistent with the rate of flow of refrigerant through conduit 52. Alternatively, oiling may be performed in sequence by drawing oil from supply 53 with pump 49 followed by refrigerant. This could be effected with only one pump whose inlet was selected by valves 48, 46 and 54.

In preparation for charging the air conditioner of a vehicle with refrigerant, it is necessary to evacuate the air-conditioner system first. For this purpose, a vacuum pump 56 is provided, said vacuum pump being connectable to the air-conditioner system of vehicle 1 through solenoid valve 57, selectively either to the low side or the high side or both of said system. Pressure detectors 55 and 58 are provided so that the pressure in the system can be determined. Connection is made, either directly or indirectly between the pressure detectors and solenoid valve 57 so that when the pressure in the system drops to a suitable level corresponding to essentially complete removal of air and moisture from the air-conditioning system, solenoid valve 57 is closed. in addition, the selected solenoid valve from the pair of solenoid valves 61 and 62 and solenoid valve 63 are opened and pump 49 is started so that flow may take place from the refrigerant tank or tanks to the low or high pressure side of the vehicle 1 air-conditioning system. As is obvious, either or both of valves 46 and 48 are also opened simultaneously as is valve 54, and metering pump 53 is started. These connections may be made directly or, preferably, through microprocessor 41.

As will be evident from FIG. 1, while the charging of vehicle 1 is being effected, the recovery and purification portion of the apparatus can be connected with vehicle 2 for recovery and purification of refrigerant therefrom. Thus, the refrigerant from vehicle 2 may be taken in sequence through solenoid valve 64 and 66 and thence through conduit 11 to filter 12 and so forth. Pressure detectors 67 and 68 are provided for control of appropriate solenoids, preferably through microprocessor 41. A second vacuum pump 69 is provided for evacuation of the air-conditioning system in vehicle 2 through solenoid valve 71 and either solenoid valve 64 or 72.

The air-conditioning systems in certain types of vehicles are so constructed that there is a third region (not shown) at which the pressure must be detected. Pressure sensor 73 is connectable through its hose to the air conditioner of either of the vehicles for this purpose, and connects with the microprocessor for displaying the pressure read at this point and for shutting down the apparatus should this be necessary Also, in order to test out the air conditioner of a vehicle after charging, it is necessary to determine the temperature at the output of the air conditioner and temperature sensor 76 is connectable to either of the vehicles for this purpose and is connected with the microprocessor for showing the temperature at the relevant region and shutting down the apparatus should this be called for. The high and low side system pressures, measured by sensors 55 and 58 on vehicle 1 and sensors 67 and 68 on vehicle 2, may be displayed continuously on the apparatus control panel in a manner similar to the manifold gauges familiar to those accustomed to the art of A/C system repair.

Where the microprocessor 41 is programmable for charging air conditioners as well as for recovering the refrigerant therefrom, it is programmable for carrying out the above-listed functions and, in addition, for initiating operation of the appropriate vacuum pump, isolating the vacuum pump when the pressure in the air-conditioning system to be charged drops to a preselected value, for initiating flow of refrigerant at the appropriate rate to the selected air-conditioning system, for regulating the addition of lubricating oil to the refrigerant in a preselected ratio, for stopping the flow of refrigerant to the air-conditioning system when the quantity transferred reaches a preselected value and for checking out the air conditioning system at the completion of charging same.

Monitoring of vehicles during the various operations is facilitated by a display such as is shown in FIG. 3 which shows the step or function in process and the status of the process for each of the vehicles. Thus, the display indicated generally by the reference numeral 77 may have signal lights 78 which show the function in process and the status of the process. Keyboard 42 is also shown in more detail, said keyboard being constructed for initiating the various operations with respect to the different vehicles and for making it possible to display such variables as temperatures and pressure. For example, pressing the buttons labelled with a vehicle and the numeral 1 and bearing the legends "evacuate", "charge liquid", "fresh refrigerant" and "inject oil" would start the sequence in which vacuum pump 56 pumps down vehicle 1, and metering pump 49 is started up when the pressure in the air-conditioning system in vehicle 1 reaches the desired low value, solenoid valves 48 and 63 are opened. Microprocessor 41 provides for carrying out the various steps in the correct sequence. Pressing either of the buttons labelled "HI" and "LO" makes the decision as to whether the filling is to be through solenoid valve 61 or solenoid valve 62. Once the process is started for vehicle 1, appropriate instructions can be given through keyboard 42 for recovery of refrigerant from vehicle 2. As will be noted, a separate display panel is provided for each of the vehicles. Additional functions can be provided as will be evident to those skilled in the art, such functions including a check-out of the operation of the various signal-generating devices and valves. The apparatus of the present invention has been designed to minimize the loss of refrigerant to the atmosphere and, in addition, to minimize energy requirement. It has already been disclosed that the non-condensible gas vented from tank 32 may be passed through a refrigeration unit 37 in order to recover as much as possible of the refrigerant carried by the vented gas. Similarly, the air vented from vacuum pumps 56 and 69 could also be passed through a refrigerated condensor. As to conservation of energy, heat exchanger 23 uses the heat generated in the compression of the refrigerant vapor to vaporize refrigerant drawn through coil 21. Viewed from the standpoint of chilling the refrigerant leaving pump 14, the cooling capacity of coil 21 may be inadequate to liquify the refrigerant in compartment 22 of heat exchanger 23. Where such is the case, the embodiment of FIG. 2 is effective. In the embodiment of FIG. 2, an air transfer means 78, shown as a fan, blows air against evaporator coil 79 to chill the air and then across condenser coil 81. The airstream continues across pump motor 16 to cool said pump motor. It will be noted that the airstream could be blown across pump motor 16 first in order to warm the air and then across evaporation coil 79 to aid in the vaporization of the refrigerant and finally across condenser coil 81 to aid in the liquification of the refrigerant therein. However, the embodiment of FIG. 2 has been found preferable.

As aforenoted, a clean-out plug or removable bowl is provided in filter 12 for draining of oil therefrom. In addition, the filter charge can also be replaced should it become saturated. Similarly, second filter 28 is also constructed so that the charge therein can be replaced. Alternatively, filter 28 may be replaceable or provided with a heating coil for driving the water out of the absorbent. When it is desired to replace filter 28 the charge therein or regenerate the charge, valve 82 may be opened to connect the interior of filter 28 with vacuum pump 56 through conduit 83. Valve 82 may be either a solenoid valve operable through the microprocessor or a manually-operated valve.

The apparatus of FIGS. 1, 2 and 3 can be readily mounted on or in a housing which in turn may be mounted on wheels for mobility. Because condensation of the refrigerant occurs at essentially ambiant temperature, the apparatus can be produced at relatively low cost, be mounted in a relatively small size housing and be mounted in a manner which permits relatively easy displacement. Such chilling as is disclosed herein is a product of use of the evaporator of the apparatus and is at a temperature which is essentially ambiant, as compared to the low temperature produced by an independent refrigeration unit.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. Apparatus for recovery of refrigerant from an air-conditioning system, comprising means for connection to the refrigerant-containing portion of said air-conditioning system; first pump means coupled at its inlet side to said connection means for producing a vacuum level at said connection means for effecting essentially complete recovery of said refrigerant and for producing a pressure at said first pump means outlet side for liquifying said refrigerant; evaporator means coupled intermediate said connection means and said pump means for vaporizing refrigerant in transit towards said pump means; condenser means coupled to the outlet side of said first pump means for liquifying said refrigerant under the pressure of said first pump means and at essentially ambient temperature; first tank means for receiving liquified condensate from said condenser means; first powered valve means movable between open and shut conditions and disposed intermediate said evaporator means and said connection means; second powered valve means movable between open and shut conditions and disposed intermediate said condenser means and said first tank means; and first pressure switch means disposed intermediate said evaporator means and said connection means for sensing the pressure thereat and operatively connected to said first and second powered valve means for automatically shutting said first and second powered valve means when the sensed pressure drops to a pre-determined level representative of conclusion of refrigerant recovery.

2. The apparatus as defined in claim 1 including first filter means coupled intermediate said evaporator means and said connection means for removing particulate matter and coalescing and removing oil from said refrigerant.

3. The apparatus as defined in claims 1 or 2, including second filter means coupled intermediate said condenser means and said first tank means for removal of moisture, residual particulate matter and acid from said refrigerant.

4. The apparatus as defined in claim 1, wherein said first and second powered valve means are solenoid valve means.

5. The apparatus as defined in claim 1, including second pressure switch means disposed intermediate said condenser means and said first tank means for sensing the pressure thereat and operatively coupled to said first and second powered valve means for shtting said first and second powered valve means when the pressure sensed by said second switch means reaches a pre-selected level representative of a blockage in said apparatus.

6. The apparatus as defined in claim 5, wherein said second pressure switch means is set to close said first and second solenoid valve means when said pressure in said third conduit means rises to about 200 psig and includes means for generating an alarm signal.

7. The apparatus as defined in claim 1 and including check valve means at the inlet to said first tank means for preventing back flow when said apparatus is not functioning.

8. The apparatus as defined in claim 1, further comprising heat-exchanger means connecting said condenser and evaporator means, whereby the latent heat involved in condensation of said refrigerant in said condenser means may be utilized for evaporation of said refrigerant in said evaporator means.

9. The apparatus as defined in claim 8, wherein said heat-exchanger means is an air-transport means for producing an airstream, said air-transport means being disposed for moving air to said condenser means and thence to said evaporator means.

10. The apparatus as defined in claim 1, further comprising means for determining the quantity of refrigerant in said first tank means.

11. The apparatus as defined in claim 1, further comprising temperature-sensing means for determining the temperature of refrigerant within said first tank means.

12. The apparatus as defined in claim 1, further comprising pressure-sensing means for determining the pressure within said first tank means.

13. The apparatus as defined in claim 1, further comprising pressure-relief means associated with said first tank means for venting gas from the upper portion thereof.

14. The apparatus as defined in claim 13, wherein said pressure-relief means is a third powered valve means and further comprising third pressure switch means connected with said third powered valve means for opening same when the pressure in said tank means reaches a selected value.

15. The apparatus as defined in claim 1, wherein said first pressure switch means is set to close said first and second powered valve means when said pressure in said second conduit means drops to about 21 inches of mercury below ambient atmospheric pressure.

16. The apparatus as defined in claim 1, further comprising microprocessor means coupled for the operative control of said apparatus to automatically control recovery.

17. The apparatus as defined in claim 16, further comprising display panel means arranged and constructed for displaying the status of the steps of the recovery operation controlled by said microprocessor means.

18. Apparatus for recovery of refrigerant from an air conditioning system, comprising means for connection to the refrigerant-containing portion of said air-conditioning system; first pump means coupled at its inlet side to said connection means for producing a vacuum level at said connection means for effecting essentially complete recovery of said refrigerant and for producing a pressure at said first pump means outlet side for liquifying said refrigerant; evaporator means coupled intermediate said connection means and said pump means for vaporizing refrigerant in transit towards said pump means; condensor means coupled to the outlet side of said first pump means for liquifying said refrigerant under the pressure of said first pump means and at essentially ambient temperature; first tank means for receiving liquified condensate from said condenser means; first powered valve means movable between open and shut conditions an disposed intermediate said evaporator means and said connection means; second powered valve means movable between open and shut conditions and disposed intermediate said condenser means and said first tank means; and second pressure switch means disposed intermediate said condenser means and said first tank means for sensing the pressure thereat and operatively coupled to said first and second powered valve means for shutting said first and second powered valve means when the pressure sensed by said second switch means reaches a pre-selected level representative of a blockage in said apparatus.

19. Apparatus for recovery of refrigerant from an air conditioning system, comprising means for connection to the refrigerant-containing portion of said air-conditioning system; first pump means coupled at its inlet side to said connection means for producing a vacuum level at said connection means for effecting essentially complete recovery of said refrigerant and for producing a pressure at said first pump means outlet side for liquifying said refrigerant; evaporator means coupled intermediate said connection means and said pump means for vaporizing refrigerant in transit towards said pump means; condenser means coupled to the outlet side of said first pump means for liquifying said refrigerant under the pressure of said first pump means and at essentially ambient temperature; first tank means for receiving liquified condensate from said condenser means; first filter means coupled intermediate said evaporator means and said connection means for removing particulate matter and coalescing and removing oil from said refrigerant; and moisture detector means disposed intermediate said second filter means and said tank means for detecting moisture escaping from said second filter means and providing an alarm indication when said moisture reaches a pre-determined level.

20. The apparatus as defined in claim 19, and including first powered valve means movable between open and shut conditions and disposed intermediate said evaporator means and said connection means and second powered valve means movable between open and shut conditions and disposed intermediate said condenser means and said first tank means, said moisture detector means being operatively coupled to said first and second powered valve means for shutting same upon detecting moisture at a pre-determined level.

21. The apparatus as defined in claim 19, including third filter means positioned intermediate said moisture detector means and said first tank means for removing residual moisture from the refrigerant.

22. The apparatus as defined in claim 19, wherein said moisture detector means is arranged and constructed for detecting moisture in said refrigerant at a level of about 10 parts per million.

23. Apparatus for recovery of refrigerant from an air conditioning system, comprising means for connection to the refrigerant-containing portion of said air-conditioning system; first pump means coupled at its inlet side to said connection means for producing a vacuum level at said connection means for effecting essentially complete recovery of said refrigerant and for producing a pressure at said first pump means outlet side for liquifying said refrigerant; evaporator means coupled intermediate said connection means and said pump means for vaporizing refrigerant in transit towards said pump means; condenser means coupled to the outlet side of said first pump means for liquifying said refrigerant under the pressure of said first pump means and at essentially ambient temperature; first tank means for receiving liquified condensate from said condenser means; and heat-exchanger means connecting said condenser and evaporator means, whereby the latent heat involved in condensation of said refrigerant in said condenser means may be utilized for evaporation of said refrigerant in said evaporator means, said heat-exchange means being an air-transport means for producing an airstream, said air-transport means being disposed for moving air to said evaporator means and thence to said condenser means.

24. The apparatus as defined in claim 23, wherein the motor of said motor pump means is disposed for cooling by said airstream.

25. Apparatus for recovery of refrigerant from an air conditioning system, comprising means for connection to the refrigerant-containing portion of said air-conditioning system; first pump means coupled at its inlet side to said connection means for producing a vacuum level at said connection means for effecting essentially complete recovery of said refrigerant and for producing a pressure at said first pump means outlet side for liquifying said refrigerant; evaporator means coupled intermediate said connection means and said pump means for vaporizing refrigerant in transit towards said pump means; condenser means coupled to the outlet side of said first pump means for liquifying said refrigerant under the pressure of said first pump means and at essentially ambient temperature; first tank means for receiving liquified condensate from said condenser means; second pump means coupled for transfer of refrigerant from an outlet of said first tank means to an air-conditioning system; vacuum pump means connectable to an air-conditioning system for evacuating same preparatory to adding refrigerant thereto; fourth powered valve means disposed intermediate said first tank means and said second pump means for controlling the flow of refrigerant therebetween; and fourth pressure switch means disposable intermediate said vacuum pump means and said air-conditioning system for sensing the pressure thereat and operatively coupled to said fourth powered valve means and said vacuum pump means for stopping said vacuum pump and opening said fourth powered valve means when the pressure sensed by said fourth pressure switch means drops to a pre-determined value.

26. The apparatus as defined in claim 25, further comprising metering pump means for adding lubricating oil in selected ratio to said refrigerant to said second pump means for transfer to an air-conditioning system.

27. The apparatus as defined in claim 26, and further including microprocessor means operatively coupled to said apparatus for the control of recovery of refrigerant from an air-conditioning system and the transfer of refrigerant and oil to an air-conditioning system.

28. The apparatus as defined in claim 25, wherein said connection means is coupled to said vacuum pump means and said second pump means for selective evacuation of an air-conditioning system coupled to said connection means, the selective charging of said air-conditioning system through said connection means and the selective recovery of refrigerant from said air-conditioning means to said connection means, said apparatus further including fifth powered valve means coupled intermediate said connecting means and said evaporator means for the selective connection of said evaporator means to said air-conditioning system to effect recovery of refrigerant.

29. The apparatus as defined in claim 28, including at least two of said connection means respectively adapted for coupling to first and second air-conditioning systems, second vacuum pump means coupled to said second connection means for the selective evacuation thereof; sixth powered valve means coupled intermediate said second pump means and said second connecting means for controlling the flow of refrigerant therebetween; fifth pressure switch means couplable to said second air-conditioning system and operatively coupled to said second vacuum pump means for shutting same and to said fourth and sixth powered valve means for opening same when the pressure sensed by said fifth pressure switch means drops to a pre-selected value; seventh powered valve means coupled intermediate said second connection means and said evaporator means for the selective coupling of said second air-conditioning system to said evaporator means for the recovery of refrigerant therefrom; and eighth powered valve means coupled intermediate with second pump means and said second connection means for controlling the flow of refrigerant therebetween and operatively coupled to said fifth pressure switch means for opening with said fourth powered valve means when said fifth pressure switch means senses that the pressure thereat has lowered to a pre-determined level.

30. The apparatus as defined in claim 25, further including second filter means disposed intermediate said condenser means and first said tank means for removal of moisture, residual matter and acid from said refrigerant; means operatively coupling said first-mentioned pump means and said second filter means; and ninth powered valve means in said last-mentioned coupling means for the selective evacuation of said second filter means to remove refrigerant therefrom.

31. The apparatus as defined in claim 25, further comprising second tank means for storing of fresh refrigerant and means operatively coupling said second tank means with said second pump means for the selective delivery of refrigerant to said second pump means.

32. The apparatus as defined in claim 25, further comprising microprocessor means operatively coupled to said apparatus for controlling the recovery of refrigerant from an air-conditioning system, the evacuation of an air-conditioning system and the transfer of refrigerant to said air-conditioning system.

33. The apparatus as defined in claim 32, wherein said microprocessor means is adapted to initiate a refrigerant recovery operation on command and to shut-down said apparatus and produce an alarm signal when any one of:
  (a) the time for the pressure at the input of said evaporator means to drop to a pre-selected value exceeds a pre-selected period;
  (b) a portion of said apparatus malfunctions; and
  (c) quantity of refrigerant in said first tank means reaches a pre-determined value.

34. The apparatus as defined in claim 25, further comprising microprocessor means coupled to said apparatus for selective control of recovery of refrigerant from an air-conditioning system and for the control of the transfer of refrigerant to an air-conditioning system.

35. Apparatus for recovery of refrigerant from an air-conditioning system, comprising means for connection to the refrigerant-containing portion of said air-conditioning system; first pump means coupled at its inlet side to said connection means for producing a vacuum level at said connection means for effecting essentially complete recovery of said refrigerant and for producing a pressure at said first pump means outlet side for liquifying said refrigerant; condenser means coupled to the outlet side of said first pump means for liquifying said refrigerant under the pressure of said first pump means and at essentially ambient temperature; first tank means for receiving liquified condensate from said condenser means; first powered valve means movable between open and shut conditions and disposed intermediate said pump means and said connection means; second powered valve means movable between open and shut conditions and disposed intermediate said condenser means and said first tank means; and first pressure switch means disposed intermediate said pump means and said connection means for sensing the pressure thereat and operatively connected to said first and second powered valve means for automatically shutting said first and second powered valve means when the sensed pressure drops to a pre-determined level representative of conclusion of refrigerant recovery.

36. The apparatus as defined in claim 35, wherein said first and second powered valve means are solenoid valve means.

37. The apparatus as defined in claim 35, including second pressure switch means disposed intermediate said condenser means and said first tank means for sensing the pressure thereat and operatively coupled to said first and second powered valve means for shutting said first and second powered valve means when the pressure sensed by said second switch means reaches a pre-selected level representative of a blockage in said apparatus.

38. The apparatus as defined in claim 35, further comprising second pump means coupled for transfer or refrigerant from an outlet of said first tank means to an air-conditioning system.

39. The apparatus as defined in claim 38, further comprising vacuum pump means conectable to an air-conditioning system for evacuating same preparatory to adding refrigerant thereto; fourth powered valve means disposed intermediate said first tank means and said second pump means for controlling the flow of refrigerant therebetween; and fourth pressure switch means disposable intermediate said vacuum pump means and said air-conditioning system for sensing the pressure thereat and operatively coupled to said fourth powered valve means and said vacuum pump means for stopping said vacuum pump and opening said fourth powered valve means when the pressure sensed by said fourth pressure switch means drops to a pre-determined value.

40. The apparatus as defined in claim 38, further comprising second tank means for storing of fresh refrigerant and means operatively coupling said second tank means with said second pump means for the selective delivery of refrigerant to said second pump means.

41. The apparatus as defined in claim 38, further comprising microprocessor means coupled to said apparatus for selective control of recovery of refrigerant from an air-conditioning system and for the control of the transfer of refrigerant to an air-conditioning system.

42. The apparatus as defined in claim 35, further comprising microprocessor means coupled for the operative control of said apparatus to automatically control recovery.

43. The apparatus as defined in claim 42, further comprising display panel means arranged and constructed for displaying the status of the steps of the recovery operation controlled by said microprocessor means.

44. Apparatus for recovery of refrigerant from an air conditioning system, comprising means for connection to the refrigerant-containing portion of said air-conditioning system; first pump means coupled at its inlet side to said connection means for producing a vacuum level at said connection means for effecting essentially complete recovery of said refrigerant and for producing a pressure at said first pump means outlet side for liquifying said refrigerant; condenser means coupled to the outlet side of said first pump means for liquifying said refrigerant under the pressure of said first pump means and at essentially ambient temperature; first tank means for receiving liquified condensate from said condenser means; first filter means coupled intermediate said pump means and said connection means for removing particulate matter and coalescing and removing oil from said refrigerant; and moisture detector means disposed intermediate said second filter means and said tank means for detecting moisture escaping from said second filter means and providing an alarm indication when said moisture reaches a pre-determined level.

45. The apparatus as defined in claim 44, and including first powered valve means movable between open and shut conditions and disposed intermediate said evaporator means and said connection means and second powered valve means movable between open and shut conditions and disposed intermediate said condenser means and said first tank means, said moisture detector means being operatively coupled to said first and secod powered valve means for shutting same upon detecting moisture at a pre-determined level.

\* \* \* \* \*